United States Patent
Locker et al.

(10) Patent No.: US 9,154,543 B2
(45) Date of Patent: Oct. 6, 2015

(54) MULTIPLE FILE TRANSFER SPEED UP

(71) Applicant: Lenovo (Singapore) Pte. Ltd., Singpaore (SG)

(72) Inventors: Howard Locker, Cary, NC (US); Toby John Bowen, Durham, NC (US); John Weldon Nicholson, Cary, NC (US); Mark Charles Davis, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 288 days.

(21) Appl. No.: 13/718,274

(22) Filed: Dec. 18, 2012

(65) Prior Publication Data

US 2014/0173050 A1    Jun. 19, 2014

(51) Int. Cl.
*G06F 15/167* (2006.01)
*H04L 29/08* (2006.01)
*H04L 29/06* (2006.01)
*H04L 12/58* (2006.01)

(52) U.S. Cl.
CPC ............... *H04L 67/06* (2013.01); *H04L 12/58* (2013.01); *H04L 29/06408* (2013.01); *H04L 29/08117* (2013.01); *H04L 29/08306* (2013.01); *H04L 65/4023* (2013.01)

(58) Field of Classification Search
CPC .............. H04L 12/58; H04L 29/08117; H04L 29/06408; H04L 29/08306; H04L 65/4023; H04L 67/06
USPC ......... 709/221, 206, 213, 214, 215, 216, 231, 709/232; 707/645; 455/411; 718/1; 719/313; 345/748
See application file for complete search history.

(56) References Cited

U.S. PATENT DOCUMENTS

| | | | |
|---|---|---|---|
| 5,421,009 A * | 5/1995 | Platt | 709/221 |
| 2003/0023695 A1* | 1/2003 | Kobata et al. | 709/206 |
| 2003/0043186 A1* | 3/2003 | Libman | 345/748 |
| 2007/0168431 A1* | 7/2007 | Lyle et al. | 709/206 |
| 2009/0119678 A1* | 5/2009 | Shih et al. | 719/313 |
| 2010/0083247 A1* | 4/2010 | Kanevsky et al. | 718/1 |
| 2012/0052838 A1* | 3/2012 | Ma et al. | 455/411 |
| 2014/0122434 A1* | 5/2014 | Knight et al. | 707/645 |

* cited by examiner

*Primary Examiner* — Le H Luu
(74) *Attorney, Agent, or Firm* — Ference & Associates LLC

(57) ABSTRACT

An aspect provides a method, including: ascertaining, at a source device, an area of a storage device inclusive of multiple selected files for transfer to a sink device; copying, at the source device, files resident in the area of the storage device inclusive of the multiple files selected for transfer to a sink device into a transfer file; creating, at the source device, a control file comprising information necessary to identify the multiple selected files for transfer included in the transfer file; and transmitting, from the source device, the transfer file to the sink device. Other aspects are described and claimed.

14 Claims, 3 Drawing Sheets

MULTIPLE FILE TRANSFER SPEED UP

BACKGROUND

Information handling devices ("devices"), for example laptop or desktop computers, tablet computing devices, smart phones, e-readers and the like, are used to transfer media files. For example, a user may wish to transfer multiple music files from an account on one device for use/consumption on another device. In such a context, a user may use a laptop computing device to copy multiple music files from a source device (which may be the laptop computing device itself or another device) to a smart phone or a tablet computing device, or some other user device.

Conventionally transfer actions such as copy actions are executed individually, for example one copy action per music file. Copying many files takes a long time. This problem is most acutely felt when backing up data or migrating to a new system, as many files need to be transferred. The transferring of many files and the time taken to complete these actions also occurs in other contexts as well.

BRIEF SUMMARY

In summary, one aspect provides a method, comprising: ascertaining, at a source device, an area of a storage device inclusive of multiple selected files for transfer to a sink device; copying, at the source device, files resident in the area of the storage device inclusive of the multiple files selected for transfer to a sink device into a transfer file; creating, at the source device, a control file comprising information necessary to identify the multiple selected files for transfer included in the transfer file; and transmitting, from the source device, the transfer file to the sink device.

Another aspect provides an information handling device, comprising: a storage device; one or more processors; and a memory operatively coupled to the one or more processors that stores instructions executable by the one or more processors to perform acts comprising: ascertaining an area of the storage device inclusive of multiple selected files for transfer to a sink device; copying the files resident in the area of the storage device inclusive of the multiple files selected for transfer to a sink device into a transfer file; creating a control file comprising information necessary to identify the multiple selected files for transfer included in the transfer file; and transmitting the transfer file to the sink device.

A further aspect provides a program product, comprising: a storage medium having computer program code embodied therewith, the computer program code comprising: computer program code configured to ascertain, at a source device, an area of a storage device inclusive of multiple selected files for transfer to a sink device; computer program code configured to copy, at the source device, files resident in the area of the storage device inclusive of the multiple files selected for transfer to a sink device into a transfer file; computer program code configured to create, at the source device, a control file comprising information necessary to identify the multiple selected files for transfer included in the transfer file; and computer program code configured to transmit, from the source device, the transfer file to the sink device The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
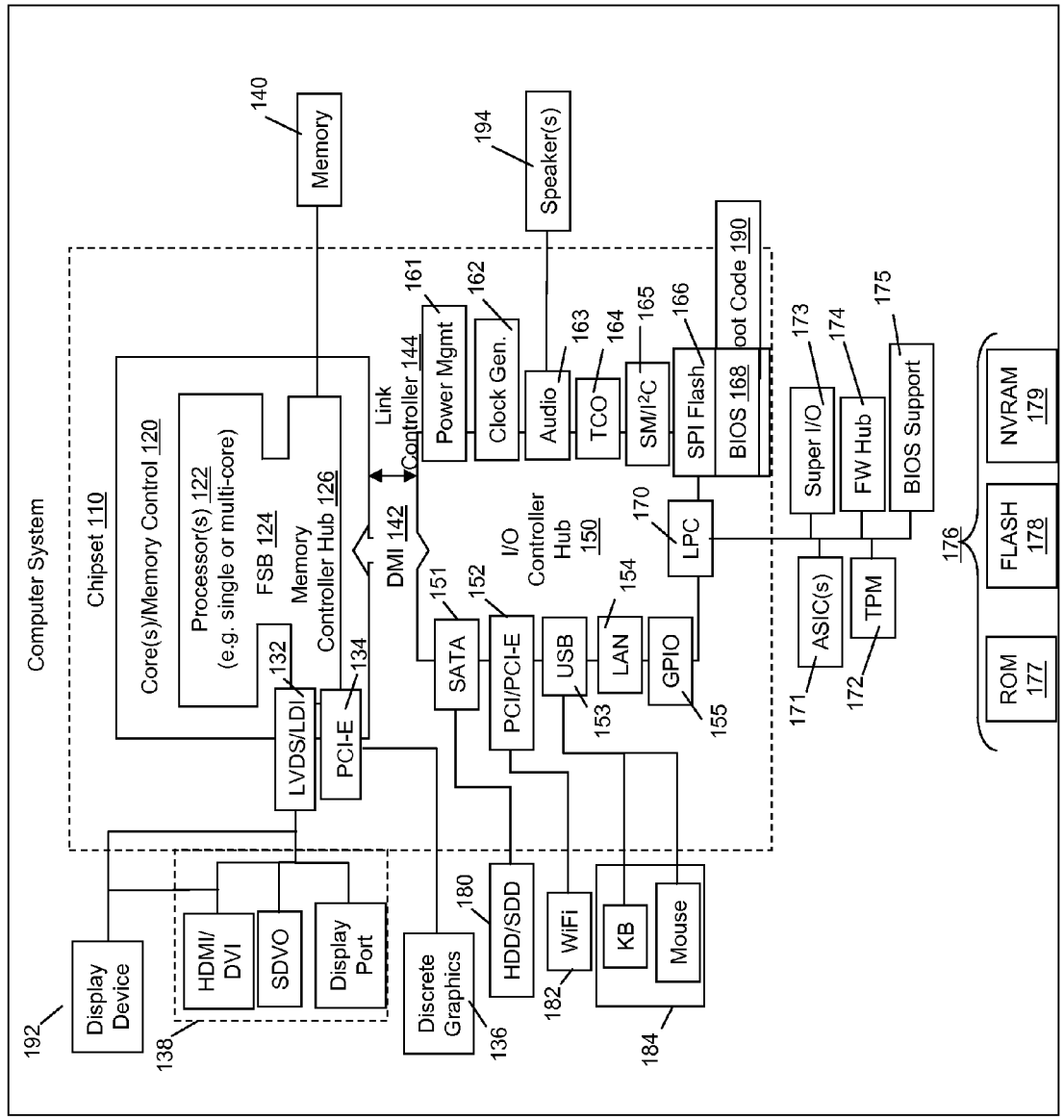
FIG. 1 illustrates an example information handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

One reason for the amount of time taken to complete transfer actions, e.g., copy actions, is because of protocol overhead on the bus that is being used to transfer (e.g., copy) the files. For instance, copying many small files across an SMB (Server Message Block, the protocol used to share folders over Ethernet in WINDOWS operating environments) link requires many file system operations/commands to be sent over the bus. This large amount of file system/protocol overhead causes the transfer of many small files to take much longer than that of a single large file. The same problem exists with transfers across other bus protocols, both internal such as SATA, and external such as USB. Unfortunately, there are no existing solutions to this problem. Storage devices, whether internal or external, provide a means for the file system to read and write data, but not a means to copy a quantity of multiple files, thereby minimizing the protocol overhead.

Accordingly, an embodiment provides mechanisms to speed up multiple file transfers, such as copy actions. In an embodiment, a low-level copy of sequential sectors from the source system to a sink system is performed. Contemporaneously, the source system creates a file (control file) that has an indication of which sectors (including parts of sectors or relevant units) that contains data within the desired copy. The sink system receives the sequential sectors and writes the sequential sectors to its file system. When the sink system gets the copy control file it can then go thought the sequential sectors data and remove/keep sectors (parts of sectors, etc.) based on the information in the copy control file.

A benefit of this approach is the time when the sink and source need to be physically connected (cable or wireless) is greatly reduced. This is because an embodiment avoids drive seek overhead as well as protocol overhead. For example, if the system had to copy different files that are in different places in an exact order (e.g., as chosen by the user), then the drive head(s) would have to move or seek to accomplish this, which takes significant time. There is also overhead to move the drive heads. Both are eliminated with this solution.

The control file may be updated within the operating system (OS) as the file system writes/rearranges the sectors, so most of the control file (the complex part) has been created prior to the transfer (e.g., copy) operation. During the transfer, as the user selects which files are within the transfer, a simple flag may be added to the transfer control file indicating if a particular file is within the intended transfer or not. The detailed information of what sectors, etc., has already been determined. Adding the flag takes significantly less time than the time it takes the user to select the desired files from the source device. This solution is optimized for a transfer of a large number of files that are scattered in different places on a storage device (e.g., a hard drive). Performance gains are better as the size of the sectors increase.

The illustrated example embodiments will be best understood by reference to the figures. The following description is intended only by way of example, and simply illustrates certain example embodiments.

FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface or something similar, e.g., embedded DisplayPort (eDP), 132 for a display device 192 (for example, a CRT, a flat panel, touch screen, et cetera). A block 138 includes some technologies that may be supported via the LVDS interface 132 (for example, serial digital video, HDMI/ DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1, may include user devices such as a source device and sink device involved in a file transfer action. A file transfer action is defined herein to mean a transfer of multiple files from a source device to a sink device. A file transfer may include but is not limited to a file copy action.

Figure 2:
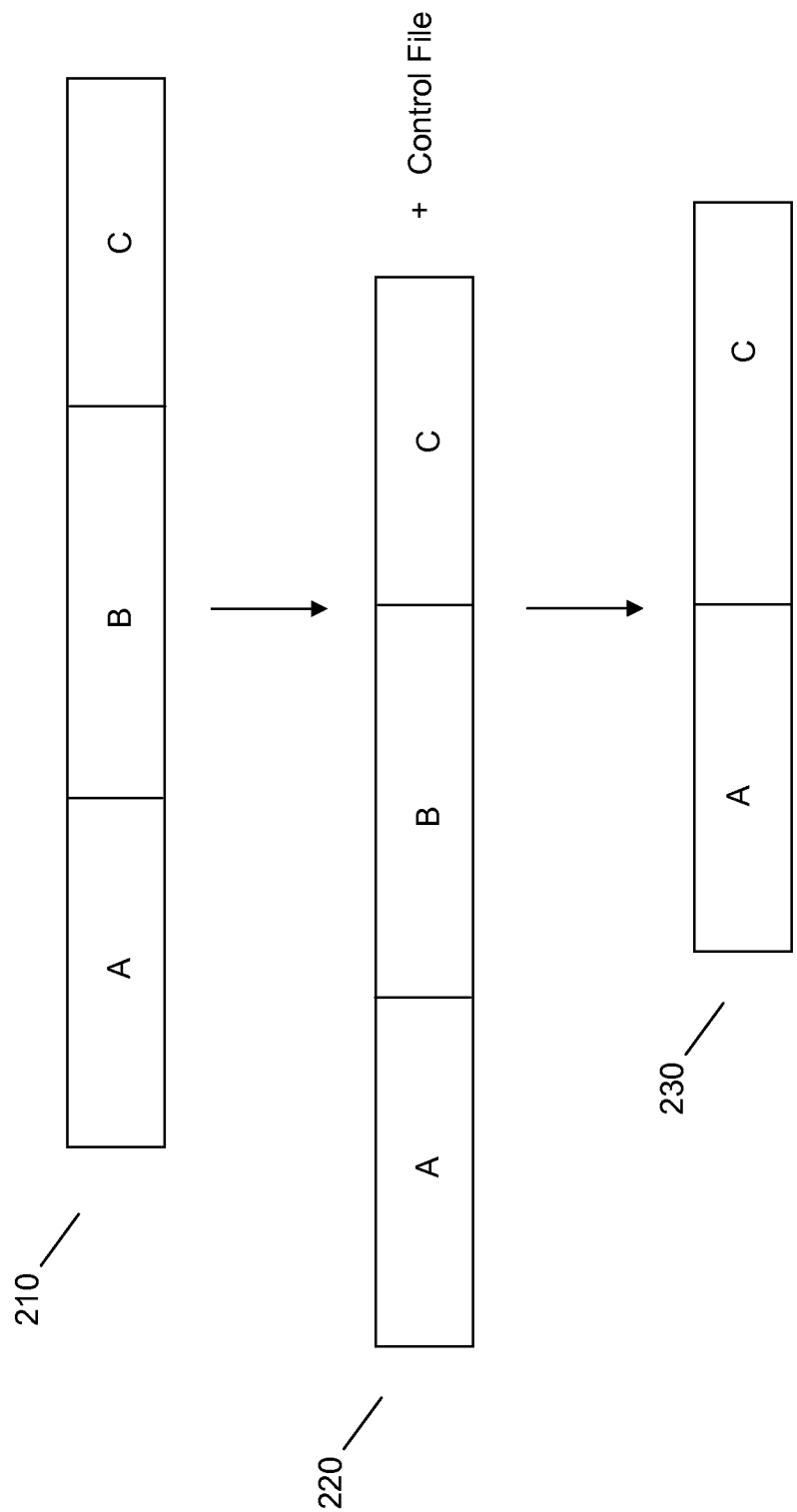
FIG. 2 illustrates an example method for multiple file transfer speed up.

Referring to FIG. 2, an example method for multiple file transfer speed up is illustrated. At a source device, for example, a user's laptop computing device, a user may select multiple files for transfer, e.g., a copy of multiple music or video files. The files may or may not be stored in locations proximate to one another on the disk. In the example illustrated in FIG. 2, a user selects files "A" and "C" for transfer. However, in storage, file "B" is stored there-between, as illustrated at 210. Thus, an embodiment completes a low-level copy of the entire storage area bounding the locations of the know files for transfer (in the example of FIG. 2, the area encompassing files "A", "B", and "C") into a transfer file at 220. Thus, the sequential files "A", "B" and "C" are copied into a transfer file.

Additionally, an embodiment prepares a control file indicating which files were actually selected for transfer by the user (here, files "A" and "C"), as well as information regarding the location of these files and/or the inclusion of any additional files (e.g., files not selected, file "B" in the example of FIG. 2) included in the transfer file. This data is transferred to a sink device (i.e., the copied files "A", "B" and "C", and the control file). Then, the sink device receives files "A", "B", and "C" as well as the control file (containing attendant information enabling the sink device to complete the transfer action).

At the sink device, which may for example be a user's tablet computing device, but may be another information handling device (e.g., notebook, smart phone, PC, etc.), the control file is utilized to complete the transfer action, as illustrated at 230. In this example, the sink device uses the control file to eliminate file "B" from the transfer file, as it was not selected by the user for transfer to the sink. Thus, although the sink received file "B", the control file provides information necessary for the sink device to eliminate it from the data that is actually retained in storage. Thus, only files "A" and "C" are left on the sink device.

As described herein, although additional data may be transferred using such an approach, other gains outweigh the additional data in certain contexts. For example, if a high bandwidth connection is available between the devices, the additional time added to transfer any additional files included in the low-level copy action of the source device is marginal. Moreover, the time saved by eliminating unnecessary seeking of individual files for individual transfer is saved, which in many cases will greatly outweigh any additional time taken to transfer additional files (in the example of FIG. 2, file "B").

It will also be appreciated that the transfer protocol overhead is largely reduced, as the file transfer actions are not completed in a piecemeal fashion. Thus, in the example of FIG. 2, the protocol overhead is reduced from what it would be for transfer of the files individually (i.e., separate transfer actions for each of file "A" and file "C"). Thus, in addition to reducing unnecessary seeking of individual files for discrete copy actions, protocol overhead is reduced. This time savings is particularly important as the number of files to be transferred grows, for example in a data backup scenario.

Figure 3:
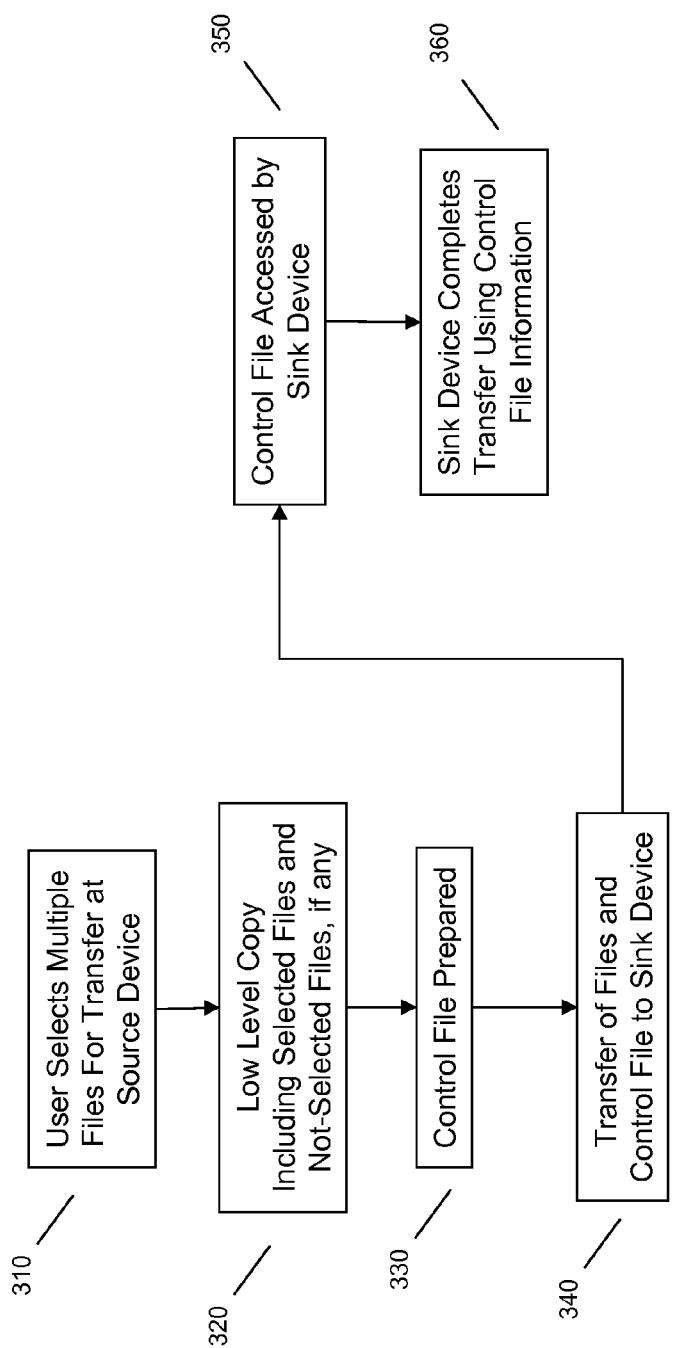
FIG. 3 illustrates an example method for multiple file transfer speed up.

FIG. 3 is a flow chart illustrating an example method for multiple file transfer speed up. At 310, multiple files are selected for transfer, e.g., multiple files selected for copy from a source device to a sink device. At 320 a low-level copy is made using the files storage locations as begin and end points for the low-level copy action. Again, this transfer file may or may not include other, non-selected files that will ultimately be transferred to a sink device (and discarded). Thus, the resultant transfer file includes files selected for transfer to a sink device and may well include files that have not been selected (but are copied due to their sequential placement on a storage device).

Step 330 includes preparation of a control file, e.g., a copy control file. This file is prepared with information (e.g., mapping and selection information) such that the files that have been selected can be distinguished from files that have not been selected (yet are included in the low level scan and copy of files, e.g., as when the selected files are scattered across different sectors). Thereafter, at 340, the files to be transferred are transmitted as a transfer file along with the control file to the sink device from the source device. The control file may be transmitted as part of the transfer file, at the same time as the transfer file, or it may be transmitted separately. In any event, the sink device receives the copied files and the control file information responsive to the transfer at 340 and accesses the control file at 350.

The sink device completes the transfer action at 360 by using the information contained in the control file. For example, the sink device may eliminate any additional file(s) that were transferred in the transfer action but were not selected. Thus, the sink device is enabled to do a "clean up" of the transferred file data such that only user selected data is stored as a result of the action.

As will be readily understood by those of ordinary skill in the relevant art, embodiments provide methods to speed up multiple file transfer actions. The various mechanisms for speeding up multiple file transfers result in reducing the time taken to complete file transfer actions, such as multiple file copy actions. The reduced time provides benefits to the user (s) by reducing wait times, as well as reducing the time that the devices (source and sink) must have an operable coupling or connection. Thus, in times where only a brief connection (e.g., wireless connection) is available, a user may still execute the transfer (e.g., copy) of multiple files with confidence, as the sink device may complete any necessary clean up actions (e.g., removal of un-selected files) offline.

While the various example embodiments have been described in connection with personal computing devices used to transfer media files such as music or video files, these were provided as non-limiting examples. Accordingly, embodiments may be used to transfer (copy, etc.,) other file types in similar contexts. Similarly, although devices such as tablets, smart phones and laptop computing devices have been used in the description as specific examples, embodiments may be utilized in connection with other types of devices, for example, e-readers, desktop computers, kiosks, and the like.

It will also be understood that the various embodiments may be implemented in one or more information handling devices configured appropriately to execute program instructions consistent with the functionality of the embodiments as described herein. In this regard, FIG. 1 illustrates a non-limiting example of such a device and components thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the functions/acts specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    ascertaining, at a source device, an area of a storage device inclusive of multiple selected files for transfer to a sink device;
    said area of the source device bounding the multiple selected files for transfer irrespective of intervening, non-selected files;
    copying, at the source device, the area of the storage device into a transfer file, wherein the transfer file includes selected media files and non-selected media files;
    creating, at the source device, a control file comprising information necessary to identify the multiple selected files for transfer included in the transfer file, wherein the information necessary to identify the multiple selected files for transfer included in the transfer file further comprises information necessary for identifying selected media file data within the area; and
    transmitting, from the source device, the transfer file to a sink device.

2. The method of claim 1, wherein the transfer file is transmitted in a single file transfer action according to a transfer protocol.

3. The method of claim 1, wherein the transmitting, from the source device, the transfer file to the sink device, comprises wirelessly transmitting the transfer file.

4. The method of claim 1, wherein the transmitting, from the source device, the transfer file to the sink device, comprises transmitting the transfer file over a wired connection.

5. The method of claim 1, wherein the control file is transmitted to the sink device separate from the transfer file.

6. An information handling device, comprising:
    a storage device;
    one or more processors; and
    a memory operatively coupled to the one or more processors that stores instructions executable by the one or more processors to:
    ascertain an area of the storage device inclusive of multiple selected files for transfer to a sink device;
    said area of the source device bounding the multiple selected files for transfer irrespective of intervening, non-selected files;
    copying the area of the storage device into a transfer file, wherein the transfer file includes selected media files and non-selected media files;
    creating a control file comprising information necessary to identify the multiple selected files for transfer included in the transfer file, wherein the information necessary to identify the multiple selected files for transfer included in the transfer file further comprises information necessary for identifying selected media file data within the area; and
    transmitting the transfer file to a sink device.

7. The information handling device of claim 6, wherein the transfer file is transmitted in a single file transfer action according to a transfer protocol.

8. The information handling device of claim 6, wherein the transmitting the transfer file to the sink device comprises wirelessly transmitting the transfer file.

9. The information handling device of claim 6, wherein the transmitting the transfer file to the sink device comprises transmitting the transfer file over a wired connection.

10. A program product, comprising:
    a storage device having computer program code embodied therewith, the computer program code being executable by a processor and comprising:
    computer program code that ascertains, at a source device, an area of a storage device inclusive of multiple selected files for transfer to a sink device;
    said area of the source device bounding the multiple selected files for transfer irrespective of intervening, non-selected files;
    computer program code that copies, at the source device, the area of the storage device into a transfer file, wherein the transfer file includes selected media files and non-selected media files;
    computer program code that creates, at the source device, a control file comprising information necessary to identify the multiple selected files for transfer included in the transfer file, wherein the information necessary to identify the multiple selected files for transfer included in the transfer file further comprises information necessary for identifying selected media file data within the area; and
    computer program code that transmits, from the source device, the transfer file to a sink device.

11. The program product of claim 10, wherein the transfer file is transmitted in a single action.

12. The program product of claim 10, wherein the transmitting, from the source device, the transfer file to the sink device, comprises wirelessly transmitting the transfer file.

13. The program product of claim 10, wherein the transmitting, from the source device, the transfer file to the sink device, comprises transmitting the transfer file over a wired connection.

14. The program product of claim 10, wherein the control file is transmitted to the sink device separate from the transfer file.

* * * * *